April 8, 1924.  
L. M. WOOLSON  
MOTOR VEHICLE  
Filed May 26, 1920  
1,489,412  
2 Sheets-Sheet 1

Inventor,  
Lionel M. Woolson,  
By Milton Tibbetts  
Atty.

April 8, 1924.  L. M. WOOLSON  1,489,412
MOTOR VEHICLE
Filed May 26, 1920    2 Sheets-Sheet 2
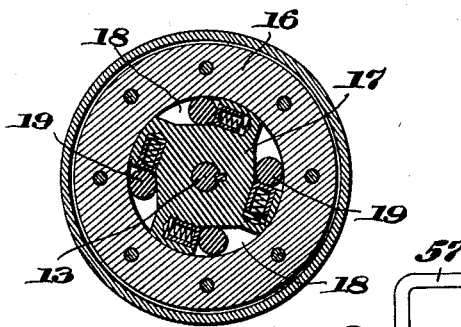
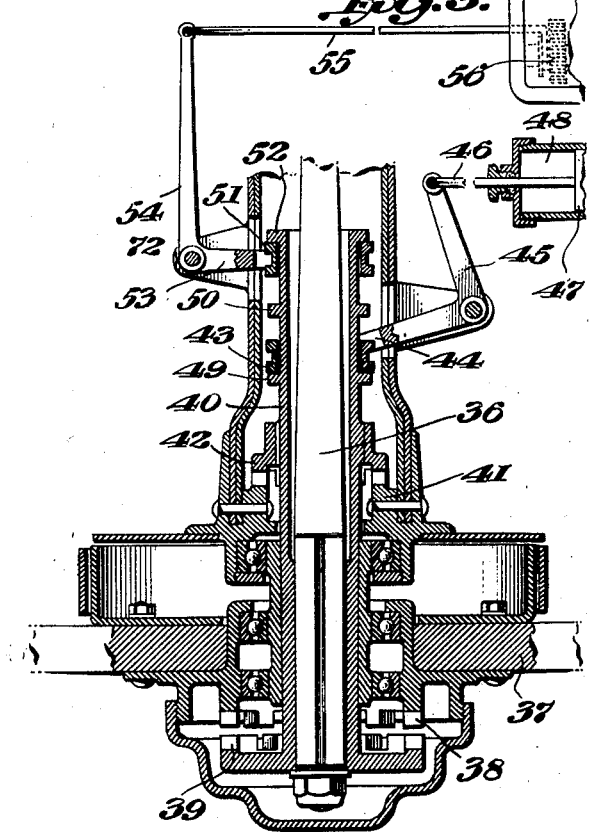
Inventor,
Lionel M. Woolson,
By [signature] Atty.

Patented Apr. 8, 1924.

1,489,412

UNITED STATES PATENT OFFICE.

LIONEL M. WOOLSON, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed May 26, 1920. Serial No. 384,352.

*To all whom it may concern:*

Be it known that I, LIONEL M. WOOLSON, a citizen of the United States, and resident of Detroit, Wayne County, State of Michigan, have invented certain new and useful Improvements in Motor Vehicles, of which the following is a specification.

This invention relates to motor vehicles and particularly to means for halving the rear axle ratio.

The principal object of the invention is to reduce the friction horsepower, that is the horsepower required to turn over the motor, and consequently to reduce the amount of fuel required for the engine, and to accomplish this result by means automatically responsive to the power demands of the vehicle.

It has been found that on a level, smooth road, the amount or horsepower required to turn the engine over at the engine speed required to drive the vehicle at a certain speed is one and one-half times as great as that required to propel the vehicle itself. It has also been found that the horsepower sufficient for driving the vehicle may be obtained at a much lower engine speed with a result of greatly reduced friction horsepower and also with greatly reduced fuel consumption.

The object of the present invention is to accommodate the engine to these conditions so that the unnecessary waste of power in driving the vehicle along smooth roads at a certain speed may be eliminated.

With the above objects and others in view the invention is embodied in preferable form in the construction hereinafter described and illustrated in the accompanying drawings, in which drawings:

Figure 2 is a section on the line 2—2 of Figure 1, showing the roller clutch between the wheel and driving shaft, and Figure 3 is a view similar to Figure 1, omitting the motor, showing another form of the invention.

Figure 1:
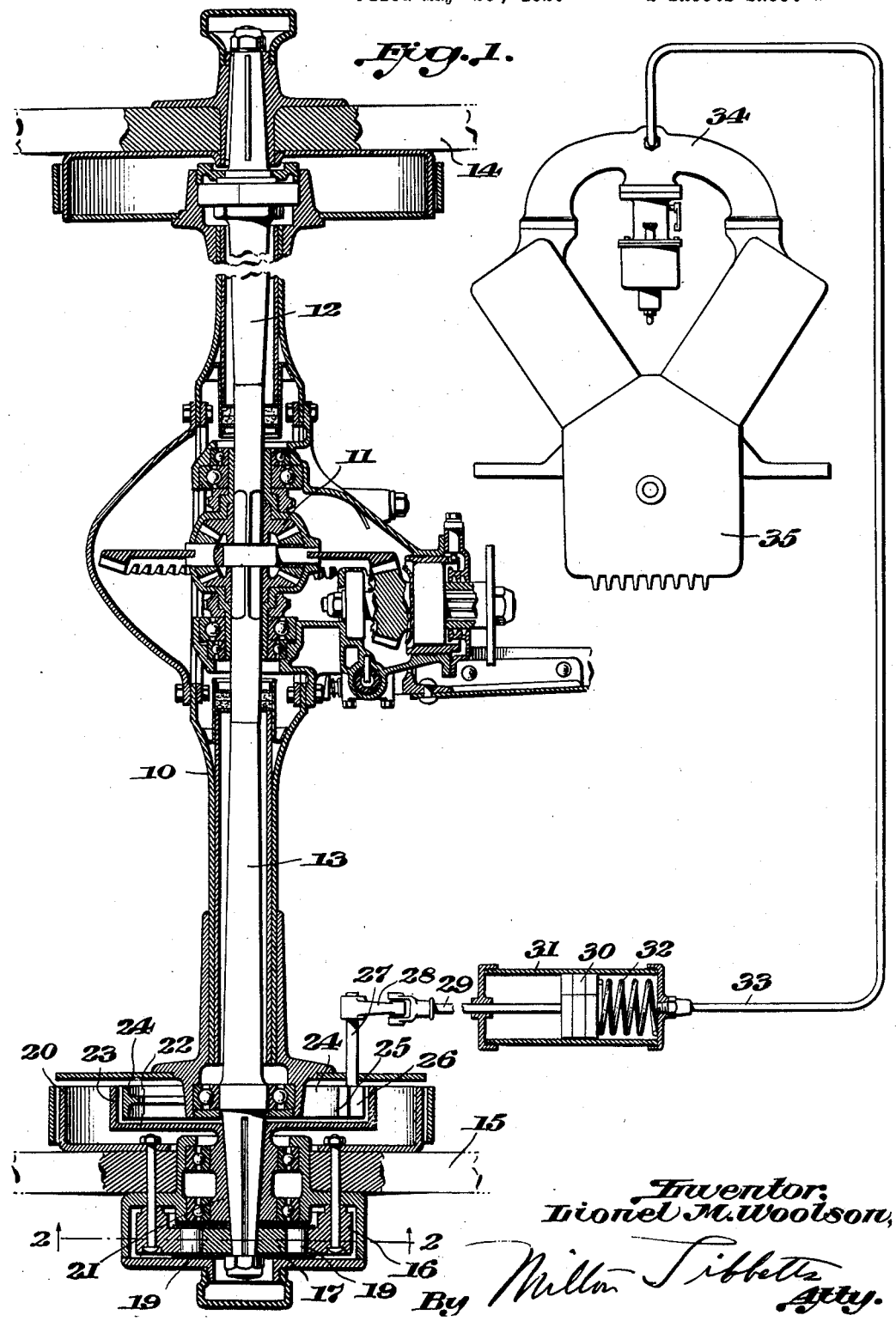
Figure 1 is a partly diagrammatic view showing a motor in end elevation and showing a rear axle in horizontal cross section with my improvements applied thereto and illustrating an operative connection between the motor and the said mechanism on the rear axle.

In carrying out the foregoing objects of the invention, means are provided for automatically halving the rear axle ratio. To do this, one of the rear wheels is mounted on its rear axle shaft in such a manner that the shaft may be retarded or locked in stationary position, while the wheel may rotate ahead freely on its own bearing. This locking of one of the axle shafts may be effected by a brake or other means controlled by the closing and opening of the throttle so that when the throttle is closed for the purpose of reducing the engine to idling or slow speed, the said axle shaft will be locked, whereupon the differential mechanism translates the motion which has previously been given to that shaft, to the other axle shaft and speeds up the latter or tends to speed it up. The engine is thereby slowed down to half its previous speed, the wheel on the locked shaft will rotate freely on its bearings; and the shaft remains locked until the throttle is again opened, whereupon the brake will release the shaft and the normal differential gear ratio is automatically established.

Referring more particularly to the embodiment of this idea and especially to the arrangement shown in Figures 1 and 2, 10 indicates the rear axle housing of a motor vehicle and 11 the differential mechanism between the driving shaft and the two axle shafts, 12 and 13. These axle shafts are supported by and adapted to drive the wheels 14 and 15. Between the wheel 15 and its shaft 13 is mounted a roller clutch adapted to effect the turning of the wheel with the shaft when the latter is driven forward and permit the wheel to rotate freely on the shaft when the latter is held stationary. This roller clutch comprises rings 16, 17, inclined recesses 18 and rollers 19 mounted in the recesses and adapted to bind together the rings carried by the shaft and wheel when the rollers move into the small part of the recesses. 20 is the drum of the usual standard brake.

For the purpose of retarding or locking one of the axle shafts or sections 12, 13, so that the other shaft may be speeded up, or the motor slowed down relative to the other shaft, suitable mechanical or electrical means may be provided. In Fig. 1 mechanical means are shown in the form of a friction brake, which means will now be described.

Keyed to the shaft 13 near its outer end is a sleeve 21 having a radial collar 22 provided with a flange 23 and constituting an external brake drum for the brake which serves to lock the axle shaft stationary. 24 indicates the internal brake drum of said brake. These brake drums are adapted to cooperate with a brake band 25 mounted on the main fixed axle housing 10. This brake band is operated by a cam 26 which may be of usual construction, and is connected to and operated by a shaft 27, which in turn is operatively connected to a bell crank lever 28 to which is pivoted a piston rod 29 carrying at its other end a piston 30 movable in a cylinder 31. The piston is adapted to be operated in one direction by the static pressure and a vacuum on opposite sides thereof, and in the opposite direction by a spring 32. The upper end of this cylinder is connected by a suction pipe line 33 with the intake manifold 34 of a hydrocarbon motor 35, whereby when a high depression is created in the manifold by the closing or approximate closing of the throttle a vacuum or partial vacuum will be created on the upper side of the piston in the cylinder, whereupon the piston will be carried upwardly so as to operate the brake, and, thus lock the shaft while the wheel 15 on said shaft will be free to rotate on the rollers of the clutch as the vehicle is driven forward.

When the throttle is opened, as in accelerating or climbing a hill, there will be less depression in the manifold which will release the brake and permit the axle shaft 13 to rotate, thereby establishing the normal differential ratio.

In Figure 3, another form of the invention is illustrated in which 36 is the axle shaft, capable of being locked against rotation and 37 is the wheel carried thereby. This wheel is adapted to be positively engaged with the axle shaft by means of a clutch, or disengaged therefrom. To this end the wheel is provided with a fixed jaw clutch member 38 with which is adapted to engage a similar jaw clutch member 39 carried on the end of a sleeve 40 keyed on the axle shaft. This sleeve is mounted to slide longitudinally and when the sleeve is in its inner or normal position the wheel and shaft will be locked together and the wheel will move with the shaft when the vehicle is driven either forward or backward.

Fixedly secured to the axle housing is a jaw clutch member 41 which co-operates with a jaw clutch member 42 fixed on the sleeve 40 so that when the sleeve is moved outward the member 42 will be engaged with the clutch part 41 and the shaft thus held against rotation. By the same movement the clutch members 38 and 39 will be released so as to permit the wheel to be free on the shaft. A sliding movement of the sleeve is effected by means of a grooved ring 43 on the sleeve with which is engaged a fork 44 adapted to be operated by a lever 45, pivoted to a piston rod 46, connected to a piston 47, mounted in a vacuum cylinder 48, adapted to have communication with the intake manifold of the motor, all as described in connection with the construction shown in Figure 1.

With the construction just described, it will be seen that when the sleeve 40 is moved outwardly in response to a depression in the manifold, the shaft will be clutched against rotation through engagement of the clutch members 41 and 42 and the wheel will be permitted to rotate freely on the sleeve by the disengagement of the clutch members 38, 39. When the sleeve is moved inward it is then permitted to rotate and the clutch members 38 and 39 will be engaged so that the wheel will be fixed to the sleeve shaft so as to be carried therewith.

Figure 3 also illustrates means whereby the clutch members 38 and 39 may be engaged so as to fix the wheel to the shaft when the vehicle is reversed, irrespective of the manifold depression control. This clutch and the reversing gear controlled means for operating it may also be applied to a construction like that of Figure 1, to enable the free wheel to be clutched to the shaft when the car is driven backward.

Referring to this arrangement, the grooved ring 43, engaged by the piston controlled fork 44, is loose on the sleeve and moves between fixed collars 49 and 50. A similar grooved ring 51 is mounted loosely on the sleeve and movable between the collar 50 and another fixed collar 52. This latter ring is engaged by a forked arm 53, connected to a lever 54, connected by rods 55 to a sliding reversing gear 56 in a gear box 57, indicated diagrammatically in the drawing. When the gear 56 is moved into reversing position it will shift the sleeve 40, so as to lock the clutch members 38 and 39 together, and hence cause the wheels to be positively driven in any backward movement of the vehicle.

While certain specific embodiments of the invention have been illustrated and described, it will be understood that further modifications and changes may be made in the construction and in the arrangement of the parts without departing from the spirit and scope of the invention as expressed in the following claims:

Having thus described my invention, what I claim and desire to secure by Letters Patent is:

1. In a motor vehicle, in combination with a motor, driving wheels, wheel driving mechanisms between said motor and said wheels, means for preventing the operation of one of said wheel driving mechanisms, and means for permittnig the free rotation of the wheel corresponding to the latter mechanism.

2. In a motor vehicle, in combination with a motor, driving wheels, a shaft for driving each wheel, means for locking one of said shafts stationary, and means for permitting the rotation of the wheel with respect to the shaft when the latter is locked.

3. In a motor vehicle, in combination with a motor, driving wheels, a shaft for driving each wheel, a clutch between said shaft and wheel whereby the shaft drives the wheel in the forward driving action of the latter, and whereby the wheel may revolve freely when the shaft is held stationary, and means for locking the shaft against rotation.

4. In a motor vehicle, in combination with a motor, driving wheels, a rear axle shaft, and means associated with said axle shaft for automatically halving the ratio between the motor shaft and the rear axle shaft.

5. In a motor vehicle, in combination with a motor, driving wheels, a shaft for driving each wheel, means for automatically locking one of said shafts stationary while permitting its wheel to rotate, upon a predetermined speed of the motor.

6. In a motor vehicle, in combination with a motor, driving wheels, a shaft for each wheel, means controlled by the adjustment of the throttle for locking a shaft stationary, and a clutch serving to lock the wheel to the shaft in the forward movement of the latter and to permit the free rotation of the wheel when the shaft is locked.

7. In a motor vehicle, in combination with a motor, driving wheels, a shaft for each wheel, means for locking one of the shafts stationary, and means controlled by the manifold depression for operating said locking means.

8. In a motor vehicle, in combination with a motor, driving wheels, drive mechanisms for said wheels, means permitting the free rotation of one of the wheels independently of its drive mechanism, and means controlled by the extent of throttle opening for locking a drive mechanism stationary while permitting its wheel to rotate.

9. In a motor vehicle, in combination with a motor, driving wheels, drive mechanisms for said wheels, means for holding one of said mechanisms stationary while permitting the free forward rotation of the corresponding wheel, and means for locking and unlocking said wheel and shaft from one another.

10. In a motor vehicle, in combination with a motor, driving wheels, axle shafts for said wheels, means for simultaneously locking one of said shafts in engagement with the fixed part of the vehicle, and means for releasing the engagement between said shaft and wheel to permit the free rotation of the latter.

11. In a motor vehicle, in combination with a motor, driving wheels axle shafts for said wheels, means permitting the free rotation of one of the wheels independently of its shaft, means for locking said shaft stationary, and means connected with the reversing mechanism for locking the wheels and shaft together when said mechanism is moved to reversing position.

12. In a motor vehicle, in combination with a motor, driving wheels, drive shafts for said wheels, positive clutch means between one of said shafts and a fixed part of the vehicle, positive clutch means between said shaft and its wheel, and means for simultaneously engaging the first clutch and disengaging the second clutch.

13. In a motor vehicle, in combination with a motor, driving wheels, an axle shaft for each wheel, one of said shafts being longitudinally movable, clutch members carried by said shaft and a fixed part of the vehicle and adapted to be engaged and disengaged in the sliding movement of said shaft, and means to permit the free rotation of the wheel upon said shaft when said clutch is engaged.

14. In a motor vehicle, in combination with a motor, driving wheels, drive shafts for said wheels, one of said shafts being longitudinally movable, a clutch carried by said shaft and a fixed part of the vehicle and adapted to be engaged and disengaged by said longitudinal movement, and a clutch carried by said shaft and the wheel thereon and adapted to be correspondingly disengaged and engaged by said movement of the shaft.

15. In a motor vehicle, the combination with the axle and driving wheels thereof, of differential driving mechanism, axle sections connecting said mechanism with the respective wheels, the connection to one wheel permitting free rotation of the wheel in one direction relative to its axle section, and means for retarding the movement of one axle section.

16. In a motor vehicle, the combination with the axle and driving wheels thereof, of differential driving mechanism, axle sections connecting said mechanism with the respective wheels, the connection to one wheel permitting free rotation of the wheel in one direction relative to its axle section, and friction means for retarding and stopping the movement of one axle section.

17. In a motor vehicle, the combination with the axle and driving wheels thereof, of differential driving mechanism, axle sections connecting said mechanism with the respective wheels, the connection to one wheel permitting free rotation of the wheel in one direction relative to its axle section, and means for retarding the movement of the latter said axle section.

18. In a motor vehicle, in combination with a motor, driving wheels, a rear axle shaft, and means associated with said axle shaft for automatically varying the ratio between the motor shaft and the rear axle shaft.

19. In a motor vehicle, a pair of spindles, a drive wheel for each spindle, a differential unit for driving the spindles, and means whereby one drive wheel may be disconnected to rotate independently with respect to the differential unit, and the differential gear associated with said wheel locked against rotation.

20. In a motor vehicle, a pair of spindles, a drive wheel for each spindle, a differential unit for driving the spindles, and means whereby one drive wheel may be disconnected to rotate independently with respect to the differential, and the differential gear associated with said wheel simultaneously locked against rotation.

In testimony whereof I affix my signature.

LIONEL M. WOOLSON.